United States Patent [19]

Vara et al.

[11] Patent Number: 5,262,450
[45] Date of Patent: Nov. 16, 1993

[54] ABRASION AND WATER-RESISTANT RADIATION CURABLE COATINGS

[75] Inventors: Fulvio J. Vara, Chester; James A. Dougherty, Pequannock, both of N.J.; Geoffrey J. Wilkins, London, United Kingdom

[73] Assignee: ISP Investments Inc., Wilmington, Del.

[21] Appl. No.: 635,039

[22] Filed: Dec. 28, 1990

[51] Int. Cl.⁵ .............................................. C08F 2/46
[52] U.S. Cl. ...................................... 522/83; 522/181; 526/320; 526/321; 526/323.2; 526/329.6; 526/332
[58] Field of Search ............... 526/323.2, 329.6, 332, 526/320, 321; 522/83, 181

[56] References Cited

U.S. PATENT DOCUMENTS

| | | | |
|---|---|---|---|
| 2,543,335 | 2/1950 | Phillips, Jr. et al. | 260/73 |
| 2,543,636 | 2/1951 | Loritsch | 260/45.4 |
| 2,755,303 | 7/1956 | Schnell et al. | 260/486 |
| 3,551,311 | 12/1970 | Nass et al. | 204/159.18 |
| 3,595,687 | 7/1971 | Labana | 117/93.31 |
| 3,663,467 | 5/1972 | Albright | 260/2.5 B |
| 3,767,600 | 10/1973 | Albright | 260/2.2 R |
| 3,870,663 | 3/1975 | Clemens et al. | 260/2.5 B |
| 4,056,503 | 11/1977 | Powanda et al. | 526/328 |
| 4,414,278 | 11/1983 | Cohen et al. | 428/402 |
| 4,515,931 | 5/1985 | Olson et al. | 526/323.2 |
| 4,529,786 | 7/1985 | Hall et al. | 526/268 |
| 4,548,990 | 10/1985 | Mueller et al. | 525/123 |
| 4,617,194 | 10/1986 | Scott et al. | 427/54.1 |
| 4,845,265 | 7/1989 | Lapin et al. | 560/84 |

FOREIGN PATENT DOCUMENTS

| | | |
|---|---|---|
| 58-13604 | 1/1983 | Japan . |
| 58-179801 | 10/1983 | Japan . |
| 58-208165 | 12/1983 | Japan . |
| 59-86616 | 5/1984 | Japan . |
| 60-228509 | 10/1985 | Japan . |
| 63-182315 | 7/1988 | Japan . |
| 674841 | 7/1952 | United Kingdom . |
| 977361 | 12/1964 | United Kingdom . |
| 1084331 | 9/1967 | United Kingdom . |

OTHER PUBLICATIONS

"New Monomers for Cationic UV-Curing" by Crivello et al., Sep. 20-23, 1982, pp. 4-28 to 4-39.

Primary Examiner—Joseph L. Schofer
Assistant Examiner—N. Sarofim
Attorney, Agent, or Firm—Walter Katz; Marilyn J. Maue; Joshua J. Ward

[57] ABSTRACT

A radiation curable composition is provided herein which comprises suitably about 50-90 parts, preferably about 60-80 parts, by weight, of a multifunctional acrylate monomer, suitably with 3-6 acrylate groups, preferably pentaerythritol triacrylate or trimethylolpropane triacrylate, about 10-50 parts by weight, preferably about 20-40 parts, by weight, of a divinyl ether monomer having both a hydrophobic backbone and an abrasion-resistant moiety, which is preferably the divinylether of cyclohexane dimethanol, and a radiation curing initiator, suitably a cationic initiator, and preferably, in combination with a free radical initiator.

4 Claims, No Drawings

ABRASION AND WATER-RESISTANT RADIATION CURABLE COATINGS

BACKGROUND OF THE INVENTION

Tu, in U.S. Pat. No. 4,319,811, disclosed radiation curing coating compositions of suitable viscosities for convenient application to various substrates as coatings having superior abrasion resistance and excellent adhesion properties. These coatings were obtained from a composition of a tri- or tetraacrylate monomer and a diluent monomer which was an N-vinyl lactam such as N-vinylpyrrolidone or N-vinylcaprolactam.

Crivello, in Proc. Rad. Curing VI, Sep. 20–23, 1982, disclosed radiation curable compositions consisting of 50% by weight of trimethylol propane triacrylate and 50% by weight of hexanediol divinyl ether.

Vara and Dougherty, in Rad Tech Europe, Conference Papers, Florence, Italy, October 9–11, 1989, described the preparation of radiation curable compositions consisting of epoxy acrylate and urethane acrylate resins and a 1:1 mixture of the divinyl ether of cyclohexane/dimethanol and the vinyl ether of triethylene glycol.

However, it has been found that these and other available coatings are not particularly water-resistant which causes a curl problem when applying the coated polyester films to a window glass substrate by means of a water-activatable adhesive.

Accordingly, it is an object of this invention to provide a radiation curable coating which has superior abrasion resistance and excellent water resistance.

A feature of the present invention is the provision of a radiation curable composition, in defined compositional ranges, which comprises a radiation curable monomer which is a multifunctional acrylate monomer and a reactive divinyl ether diluent monomer which has a hydrophobic component which includes both water-resistant and abrasion-resistant moieties, the combination of both monomers affording coatings which exhibit excellent abrasion-resistance, adherence to substrates, rapid curing and water-resistance.

These and other objects and features of the invention will be made apparent from the following more particular description of the invention.

SUMMARY OF THE INVENTION

A radiation curable composition is provided herein which comprises suitably about 50–90 parts, preferably about 60–80 parts, by weight, of a multifunctional acrylate monomer, suitably with 3–6 acrylate groups, preferably pentaerythritol triacrylate or trimethylolpropane triacrylate, about 10–50 parts by weight, preferably about 20–40 parts, by weight, of a divinyl ether monomer having a hydrophobic backbone and an abrasion-resistant moiety, which is preferably the divinylether of cyclohexane dimethanol, and a radiation curing initiator, suitably a cationic initiator, and preferably, also including a free radical initiator.

The composition herein provides coatings which are abrasion and water-resistant, have a suitable viscosity for convenient application to substrates, cure rapidly, are adherent to such substrates as polyester films, and do not curl after being adhered to such films by activation of water-treatable adhesives.

DESCRIPTION OF THE INVENTION

In accordance with the present invention, there is provided an effective radiation curable coating which exhibits excellent resistance to water and superior abrasion resistance. These properties are achieved in a formulation which includes a primary radiation curable monomer which is a multifunctional acrylate having at least 3, preferably 3–6 acrylate groups, admixed with a reactive diluent monomer which is a divinyl ether having a hydrophobic backbone and an abrasion-resistant moiety.

The primary multifunctional acrylate monomer is preferably pentaerythritol triacrylate (PETA) or trimethylolpropane triacrylate (TMPTA). The structural formula of these compounds are:

Pentaerythritol Triacrylate (PETA)

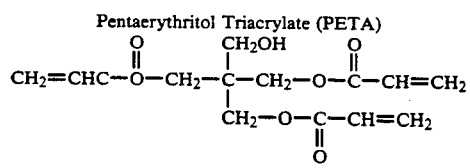

Trimethylolpropane Triacrylate (TMPTA)

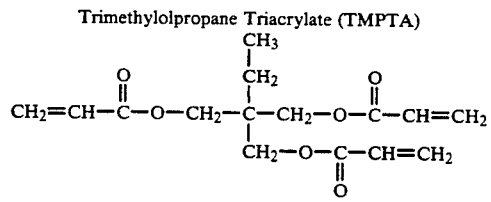

Acrylated dimers of suitable polyols having from 3–6 acrylate groups also may be used.

The reactive diluent monomer of the formulation is a divinylether having a water-resistant hydrophobic component in the molecule, preferably a hydrocarbon chain, and a cycloaliphatic ring which enhances abrasion-resistance. A preferred compound is the divinylether of cyclohexane dimethanol (CHVE). The structural formula of this compound is:

Divinylether of Cyclohexane Dimethanol (CHVE)*

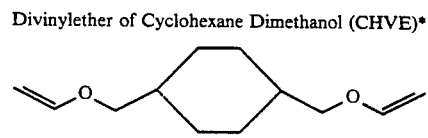

* Rapicure ® CHVE (GAF Chemicals Corp.)

In this molecule, the divinyl groups of the compound are radiation curable, the hydrocarbon backbone is hydrophobic towards water, and the cyclohexane ring moiety enhances the abrasion resistance of the coating.

A photoinitiator is included in the composition to enhance cure rate. Although a cationic initiator alone may be used, it is preferred that a hybrid initiator system be used which comprises both a cationic and a free radical initiator. The cationic initiator in this system is particularly effective for curing the divinylether monomer while the free radical initiator can respond efficiently with respect to cure of the acrylate monomer. A cationic initiator which includes a free radical initiator component therein also may be used.

Suitable cationic initiators include the triphenylsulfonium salt of phosphorous hexafluoride, $PF_6^-$, antimony hexafluoride, $SbF_6^-$, arsenic hexafluoride, $A_sF_6^-$, or boron tetrafluoride, $BF_4^-$; as well as diphenyliodonium salts, tetrazolium chloride, a phenyl onium salt and an alkyl aryl onium salt. A preferred cationic photoinitiator is triphenylsulfonium hexafluorophosphate.

Suitable free radical initiators include p-phenoxy dichloro acetophenone, dimethoxy phenyl acetophenone, dibutoxy acetophenone, chlorinated benzophenone aryl ketone, 4-(4-methylphenylthio) phenyl phenylmethanone and 4-benzoyl-4-methyldiphenyl sulfide, including a coinitiator of 2-(dimethylamino) ethyl benzoate, sold as Quantacure by International Bio-Synthetics. The (p-phenoxy)dichloro acetophenone is sold under the Trademark Sandoray 1000 by Sandoz Corporation and the (dimethoxy phenyl) acetophenone, is sold under the Trademark Irgacure 651, by Ciba-Geigy Corporation. Their structures are as follows:

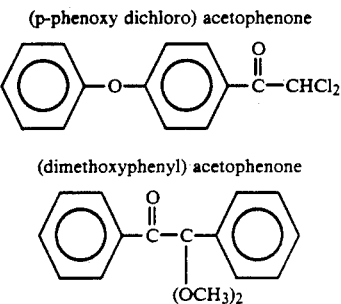

The chlorinated benzophenone is sold under the Trademark Trigonal P-1 by Noury Corporation and Eastman FI-4 by the Eastman Corporation. The aryl ketones are sold under the Trademarks EM-1173 and EM-1176 by Merck Corporation. The $\alpha$-isobutoxy-$\alpha$-phenyl acetophenone is sold under the Trademark Vicure 10 by Stauffer chemical Corporation and is 2-chlorothioxanthone sold under the Trademark Sandoray 1050 by Sandoz Corporation.

Where equipment limitations do not preclude the use of a controlled nitrogen atmosphere or a slow curing rate is of no consequence, suitable free radical photoinitiators can include vicinal ketaldonyl compounds (i.e., compounds containing a ketone group and an aldehyde group) such as diacetyl, benzil, 2,3-pentanedione, 2,3-octanedione, 1-phenyl-1,2-butanedione, 2,2-dimethyl-4-phenyl-3,4-butanedione, phenyl-glyoxal, diphenyl-triketone; aromatic diketones, such as anthraquinone; acyloins, such as benzoin, pivaloin acryloin ethers, such as benzoin-methyl-ether, benzoin-ethyl-ether, benzoin-butyl-ether, benzoin-isobutyl-ether, benzoin-phenyl-ether; alpha-hydrocarbon substituted aromatic acyloins, including alpha-methyl-methylbenzoin, alpha-alkyl-benzoin, as in U.S. Pat. No. 2,722,512, and pheylbenzoin; diaryl ketones, such as benzophenone and dinaphthyl ketone; and organic disulfides, such as diphenyldisulfide. Dimethoxyphenylacetophenone such as IRGACURE 651 available from Ciba-Geigy or Sandoray 1000 are preferred.

Generally, at relatively low curing rates, it is not necessary to incorporate a free radical photoinitiator in the composition. For example, at a curing speed of 80 m/min, comparable pencil hardness and cross-hatch adhesion was achieved on polycarbonate and polymethylmethacrylate substrates using 0.6 parts of cationic hexa-fluorophosphate initiator alone in the composition of the invention or with a combination of 0.2 parts of the same cationic initiator and 0.3 parts of free radical Irgacure 651 initiator.

The radiation curable composition of the invention includes the following components in the stated amounts, given in parts by weight, unless otherwise stated.

TABLE I
RADIATION CURABLE COMPOSITIONS OF INVENTION

| Component | Suitable | Concentration Preferred | Optimum |
|---|---|---|---|
| Multifunctional Acrylate Monomer | | | |
| PETA or TMPTA | 50-90 | 60-80 | 70 |
| Reactive Divinylether Diluent Monomer | | | |
| CHVE | 10-50 | 20-40 | 30 |
| Photoinitiator | | | |
| Cationic Initiator, phr | 0.5-4 | 0.6-1.5 | 0.8 |
| Free Radical Initiator, phr | 0-4 | 2-3 | 2.4 |
| Composition | | | |
| Viscosity, cps | 50-400 | 75-200 | 100 |

The radiation curable composition of the invention is prepared by heating a mixture of the individual components at about 50° C. with stirring.

The coating composition can also contain an additional polymerization inhibitor to prevent undesirable auto-polymerization of the coating composition in storage prior to use. Examples of suitable addition polymerization inhibitors include, among others, di(1,4 sec-butylamino) benzene available from the DuPont Company under the trade name "Anti-Oxidant 22" and Monomethyl Ether of Hydroquinone and Hydroquinone phenothiazine available from Tefenco Chemical Co. The additional polymerization inhibitor is present in an amount sufficient to prevent auto-polymerization and is generally present in an amount from 100-300 PPM based on the weight of the coating composition.

The coating composition can also contain a surfactant. The preferred surfactants are silicone surfactants such as that available from the dow corning Corporation under the trade name "DC-193". The surfactant is present in an amount necessary to reduce the surface tension of the coating composition and reduce its viscosity to the desired level. The surfactant generally comprises from 0.01 to 1 phr of the coating composition, preferably about 0.2-0.7 phr.

The coating compositions of the present invention can also contain other conventional additives, such as flow control and leveling agents, organic and inorganic dyestuffs and pigments, fillers, plasticizers, lubricants, and reinforcing agents, such as alumina, silica, clay, talc, powdered glass, carbon black and fiberglass.

Preferably, about 2-5 parts of a highly dispersed silica of 99.5% purity and an average primary particle size of 15-45 nm, hydrophilic or hydrophobic, should be added to the composition to increase the abrasion resistance with plastic substrates of about 20-80%. For example, when the coating composition containing such silica is applied to polycarbonate at 6 um and cured at 80 m/min, the abrasion resistance is increased from 20 cycles to 100 cycles at the same loading.

The properties of the composition and films thereof, were determined by first measuring the viscosity of the composition, then casting the composition onto a primed polyester film using a #6 Mayer bar to produce a curable coating having a thickness of about 0.5 mil. The primed polyester films were films treated for adhesion enhancement and sold under the designation "clear-055-primed" by ICI Corporation and "4561-primed" by Celanese Corporation. The coatings were cured in air and nitrogen using two 200 watt/inch lamps on a variable speed conveyor. The abrasion resistance was determined with a 0000 steel wool and compositions were ranked qualitatively from poor to excellent. Other coating properties are given in Tables II and III below.

TABLE II

COATINGS WITH 80 TMPTA/20 CHVE MONOMER COMPOSITIONS

| Reactive Diluent Monomer | Composition Viscosity (cps) | Maximum Cure Speed (air) | Maximum Cure Speed ($N_2$) | Abrasion Resistance | Pencil Hardness | Adhesion to Polyester | MEK Rubs |
|---|---|---|---|---|---|---|---|
| Control |  |  |  |  |  |  |  |
| 80 PETA/20 V-Pyrol ® | 41 | 40 | 300 | EXC | 2H | 100 | >100 |
| Invention |  |  |  |  |  |  |  |
| 80 TMPTA/20 CHVE | 36 | 40 | 300 | GOOD | 2H | 100 | >100 |

TABLE III

COATINGS WITH 80 PETA/20 CHVE COMPOSITIONS

| Reactive Diluent Monomer | Composition Viscosity (cps) | Maximum Cure Speed (air) | Maximum Cure Speed ($N_2$) | Abrasion Resistance | Pencil Hardness | Adhesion to Polyester | MEK Rubs |
|---|---|---|---|---|---|---|---|
| Control |  |  |  |  |  |  |  |
| 80 PETA/20 V-Pyrol | 106 | 100 | 500 | EXC | 2H | 100 | >100 |
| Invention |  |  |  |  |  |  |  |
| 80 PETA/20 CHVE | 182 | 100 | 500 | EXC | 3H | 100 | >100 |

*curing rate - 50 ft/min/2 lamps

The abrasion resistance of the inventive composition of PETA/CHVE was comparable to a control composition of PETA/V-Pyrol ®.

The abrasion resistance of coatings formed from cured formulations of 80 PETA/20 CHVE on polycarbonate was determined on a DuPont Steel Wool Rotary Test. The yellowness index was also determined using a Hunter Colorimeter.

TABLE IV

Abrasion Resistance and Yellowness Index

| Reactive Diluent Monomer | Delta Haze* | Yellowness Index |
|---|---|---|
| Control |  |  |
| 80 PETA/20 V-Pyrol |  0.2 | 0.70 |
| Invention |  |  |
| 80 PETA/20 CHVE | 0.7 | 0.61 |

*DuPont Steel Wool Rotary Test

The results show comparable abrasion performance (less than 1% delta haze) for both the control and invention compositions, and an improved yellowness index for the composition of the invention.

The hydrophilic curl of a hybrid coating of 30% CHVE/70% PETA was compared to the control. A thin polyester film was coated with these compositions using a #6 Mayer rod and cured. The cured samples tended to curl with the coated side inside. The coatings then were wetted with a fine mist of water and the change in curl was observed. The control coating rapidly reversed the direction of curl (i.e., curls with coated side outside), while the hybrid coating of the invention went to a straight, no curl, position.

Accordingly, the invention includes the preparation of a laminate structure comprising a substrate, such as window glass having adhered thereto an adhesive primed polyester film having an abrasion and water-resistant radiation cured coating thereon formed by curing the composition of the invention. The coating can be applied by conventional techniques including dip, spin, spray, curtain coat, gravure, and roller. After applying the composition as a coating onto the adhesive-primed polyester film, the coated film is cured and then adhered to the window glass with water. Such laminates have substantially no resultant curl, indicating excellent resistance to water treatment.

Among the other applications for the coating is the coating of plastic lenses made from materials, such as cellulose acetate butyrate, cellulose acetate propionate, cellulose acetate, polycarbonate, polystyrene, methyl methacrylate, copolymer of styrene and methyl methacrylate, and allyl diglycol carbonate.

Additionally, the coatings can be used on flexible or rigid plastic materials, including sheets, foams and various shapes, such as associated with cast forms. The coatings can be applied and cured either before or after the molding operation. Additional plastic substrates include polyolefins, such as polypropylene and polyethylene, polycarbonate, polyvinyl chloride (PVC), polyethylene terephthalate (PET), polybutylene terephthalate (PBT), polystyrene, methyl methacrylate, polyamide (nylon), polymethyl pentene and polyethersulfone.

Protected top coatings included radiation cured coatings, pigmented coatings, varnishes, and the like. Additional substrates include:
Wood
Metal, such as aluminum, steel and copper
Paper, including impregnated and surface coated paper
Glass, including fiberglass and glass fiber optics
Tile, such as ceramic, vinyl and vinyl/asbestos and
Textiles, including various natural and synthetic fibers.

While the invention has been described with particular reference to certain embodiments thereof, it will be understood that changes and modifications may be made which are within the skill of the art. Accordingly, it is intended to be bound only by the following claims, in which:

What is claimed is:

1. An abrasion and water resistant radiation curable composition consisting essentially of about 50–90 parts by weight of multifunctional acrylate monomer having from 3–6 acrylate groups, about 10–50 parts by weight of a reactive diluent monomer which is a divinylether having a hydrophobic backbone which includes an abrasion resistant moiety and which is the divinylether of cyclohexane dimethanol, about 0.5–4 phr of a cationic initiator, about 0–4 phr of a free radical initiator, and about 0–1 phr of a surfactant.

2. A composition according to claim 1 in which said multifunctional acrylate monomer is pentaerythritol triacrylate.

3. A composition according to claim 2 which includes about 60–80 parts by weight of pentaerythritol triacrylate, about 20–40 parts by weight of the divinylether of cyclohexane dimethanol, about 0.6–1.5 phr of a cationic initiator, about 2–3 of a free radical initiator, about 0.2–0.7 phr of a surfactant, the viscosity of the composition being about 75–200 cps.

4. A composition according to claim 1 which consists essentially of about 70 parts by weight of pentaerythritol triacrylate, about 30 parts by weight of the divinylether of cyclohexane dimethanol, about 2.4 phr of a cationic initiator, about 0.5 phr of a free radical initiator, and about 0.5 phr of a surfactant.

* * * * *